(12) United States Patent
Tang et al.

(10) Patent No.: US 8,737,739 B2
(45) Date of Patent: *May 27, 2014

(54) ACTIVE SEGMENTATION FOR GROUPS OF IMAGES

(75) Inventors: Xiaoou Tang, Haidian District (CN); Qiong Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,881

(22) Filed: Oct. 19, 2011

(65) Prior Publication Data

US 2012/0093411 A1    Apr. 19, 2012

Related U.S. Application Data

(63) Continuation of application No. 12/025,703, filed on Feb. 4, 2008, now Pat. No. 8,045,800.

(60) Provisional application No. 60/943,247, filed on Jun. 11, 2007.

(51) Int. Cl.
*G06K 9/34* (2006.01)

(52) U.S. Cl.
USPC ............................ 382/173; 382/167; 382/171

(58) Field of Classification Search
USPC .......................................... 382/173, 167, 171
See application file for complete search history.

(56) References Cited

U.S. PATENT DOCUMENTS

| | | | |
|---|---|---|---|
| 5,751,852 A | 5/1998 | Marimont et al. | |
| 5,774,579 A | 6/1998 | Wang et al. | |
| 5,930,783 A | * | 7/1999 | Li et al. .................. 1/1 |
| 6,731,799 B1 | 5/2004 | Sun et al. | |
| 6,792,164 B2 | 9/2004 | Syeda-Mahmood | |
| 6,804,684 B2 | 10/2004 | Stubler et al. | |
| 6,820,223 B2 | 11/2004 | Heishi et al. | |
| 6,915,011 B2 | 7/2005 | Loui et al. | |
| 6,993,184 B2 | 1/2006 | Matsugu | |
| 7,043,474 B2 | 5/2006 | Mojsilovic et al. | |
| 2002/0198909 A1 | 12/2002 | Huynh et al. | |

(Continued)

OTHER PUBLICATIONS

Bradshaw, et al.,"Semantic Based Image Retrieval: A Probabilistic Approach", 2000 Proceedings of the 8th ACM Intl Conf on on Multimedia, Oct. and Nov. 2000, pp. 167-176.
International Search Report and Written Opinion for PCT/US2008/066608, mailed Nov. 13, 2008, 9 Pages.
Miller, et al., "Tracking of Moving Objects Based on Graph Edges Similarity", Multimedia and Expo 0; 2003 ICME'03 Proceedings, IEEE, vol. 03. Jul. 9, 2003. pp. 73-76.

(Continued)

*Primary Examiner* — Ali Bayat
(74) *Attorney, Agent, or Firm* — Carole Boelitz (MSFT); Micky Minhas (MSFT); Lee & Hayes, PLLC

(57) ABSTRACT

Systems and methods of segmenting images are disclosed. The similarity of images in a set of images is compared. A group of images is selected from the set of images. The images in the group of images are selected based on compared similarities among the images. An informative image is selected from the group of images. User-defined semantic information of the informative image is received. The group of images is modeled as a graph. Each image in the group of images denotes a node in the graph. Edges of the graph denote a foreground or background relationship between images. One or more images in the group of images may be automatically segmented by propagating semantic information of the informative image to images in the group having a graph node corresponding to the informative image. Segmentation results can be refined according to user provided image semantics.

20 Claims, 7 Drawing Sheets

(56) References Cited

U.S. PATENT DOCUMENTS

| | | |
|---|---|---|
| 2003/0123737 A1 | 7/2003 | Mojsilovic et al. |
| 2003/0169812 A1 | 9/2003 | Maziere et al. |
| 2006/0029275 A1 | 2/2006 | Li et al. |
| 2006/0257053 A1 | 11/2006 | Boudreau et al. |
| 2007/0133880 A1 | 6/2007 | Sun et al. |
| 2007/0183670 A1 | 8/2007 | Owechko et al. |
| 2007/0217676 A1 | 9/2007 | Grauman et al. |
| 2008/0304743 A1 | 12/2008 | Tang et al. |
| 2009/0123021 A1* | 5/2009 | Jung et al. .................... 382/100 |

OTHER PUBLICATIONS

Naphade, et al., "Extracting Semantics from Audiovisual Content: The Final Frontier in Multimedia Retrieval", vol. 13, Issue 4, Jul. 2002, IEEE, pp. 793-810.

Schnitman, et al., "Inducing Semantic Segmentation from an Example", Computer Vision, ACCV 2006, Jan. 2006, pp. 373-384.

Smeulders, et al., "Content-Based Image Retrieval at the End of the Early Years", IEEE Transactions on Pattern Analysis and Machine intelligence, vol. 22, No. 12, Dec. 2000, pp. 1349-1380.

* cited by examiner

ACTIVE SEGMENTATION FOR GROUPS OF IMAGES

CROSS REFERENCE TO RELATED APPLICATIONS

This patent application is a continuation of co-pending, commonly owned U.S. patent application Ser. No. 12/025,703, filed Feb. 4, 2008, which claims the benefit of U.S. Provisional Patent Application Ser. No. 60/943,247 filed Jun. 11, 2007, entitled "ACTIVE SEGMENTATION FOR GROUPS OF IMAGES", which applications are hereby incorporated in their entirety by reference.

BACKGROUND

Modern media capturing devices have become popular in today's world and have allowed the ubiquitous generation of digital images. However, collection of the vast number of photos and videos is just a very small part of interests of the modern fashionable people. Further management and individual processing gain more interest. Typically, making a photo album after a trip has become the dream of many families. Video foreground segmentation for further analysis or composition can also be challenging. Various individual demands make the user interaction inevitable to define the semantic information. Especially, large number of tough segmentation tasks challenges user's patience. Cutting out foregrounds from groups of images is a quite tough problem, and a lot of user interaction efforts are needed to obtain good results in existing works.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Described herein are various techniques and technologies directed to permitting to segment groups of images without any prior of the relationship of the images or even the number of the classes with few user interactions. The system can construct an image relationship graph automatically. That is to say, images that are related, some sharing the similar foreground, some sharing the similar background, can be grouped together. Typically, all the images might form a connected graph with the foreground/background relationship as the connected edge. Once the images graph is constructed automatically, then the user's semantics on informative images is received. The semantics could be propagated among the whole graph effectively. Thereby, the task of cutting out foregrounds from the whole group of images can be greatly simplified. In addition, poorly segmented and informative images are further actively selected to request user for refinement. This refinement information is also propagated along the graph to automatically refine other poorly segmented images with similar segmentation errors. Active segmentation can be performed iteratively until the entire group of images is accurately segmented.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The system described is provided as an example and not a limitation. As those skilled in the art will appreciate, the present examples are suitable for application in a variety of different types of synchronization of postings.

According to the methods disclosed herein, images are grouped according to their similarities, and informative images are automatically selected for each group. A user is requested to provide labeling semantics. Then, the relationship between the images is constructed via foreground and background classification. The segmentation information of the informative images is then automatically propagated to related images in the group. Poorly segmented images which represent the typical errors would be selected to request the user for refinement, and this error refinement information is also automatically propagated to other related images within the group. In this way, the user could get satisfactory results on groups of images with much fewer interactions than existing methods. As disclosed herein, a foreground generally refers to the object of an image. For example, in a portrait the object would be the face of the individual. Furthermore, a background generally can refer to the scene of an image. For instance, in a portrait the scene could be the backdrop behind the individual in the portrait.

Figure 1:
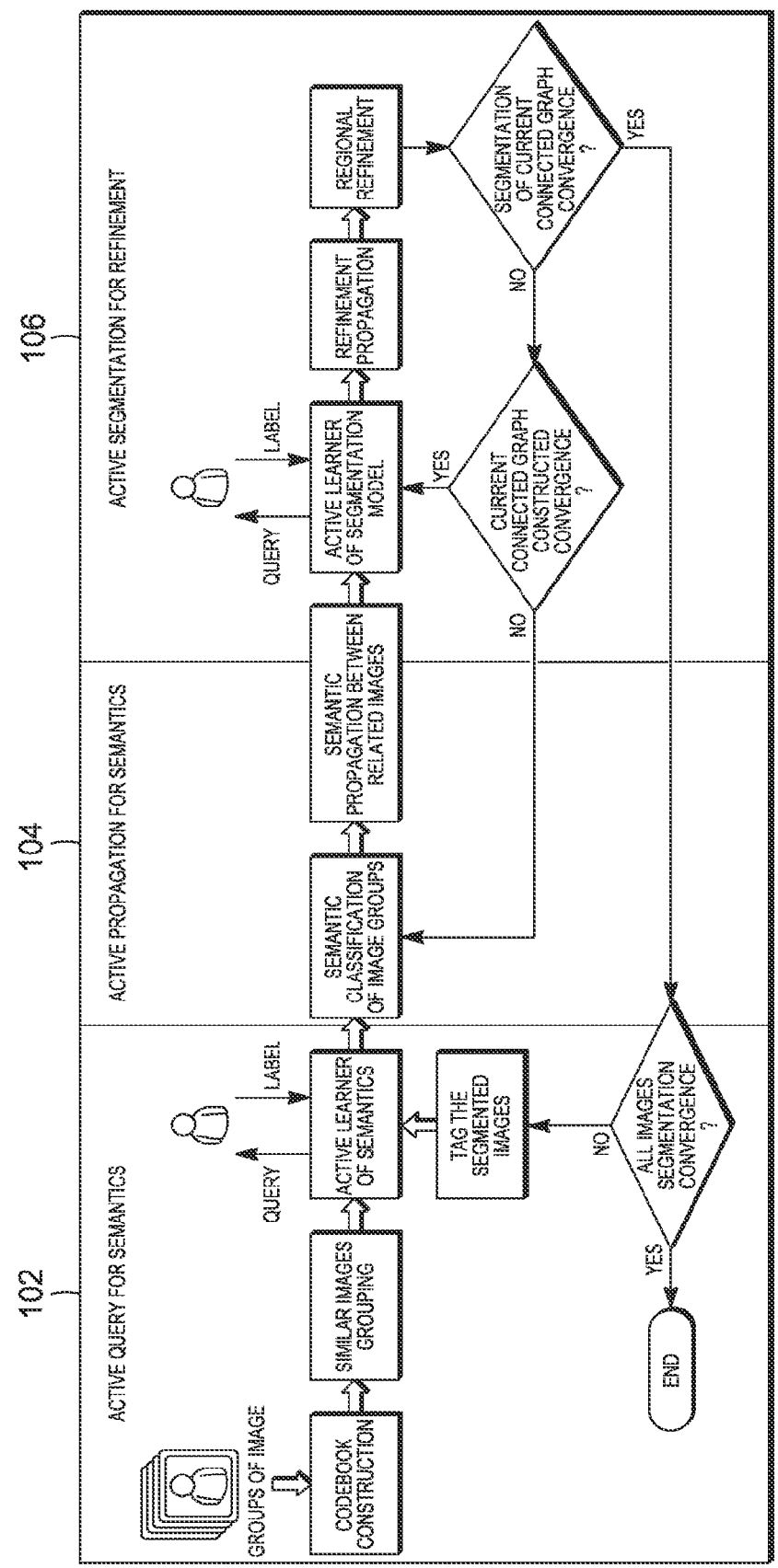
FIG. 1 illustrates a diagram of a system for providing active segmentation for groups of images according to one embodiment.

FIG. 1 illustrates a diagram of a system for providing active segmentation for groups of images according to one embodiment. The active segmentation of images may include three aspects: active query for semantics 102, active propagation of semantics 104, and active segmentation refinement 106.

In the active query for semantics 102, informative images are actively selected as a query to request the user for labeling semantics and refining errors. Given groups of images, the segmentation system analyzes the images by utilizing compositions called words. A code book can be constructed to understand the words of each image. Then, those similar images could be grouped based on the similarity of the global word distribution of each image.

Once the basic components of the groups of the images are known, the active learner of semantics can be configured to select the most informative images with the most non-overlapping words to request the user for labeling.

In the active propagation of semantics 104, the semantic information is propagated actively for the segmentation of related images. After obtaining the user defined semantic information, the foreground and background relationship between the labeled images and the unlabeled images could be revealed via foreground/background recognition methods. That is to say, images are connected according to the semantics of foreground and background. In this way, the group of images are modeled as a graph, where each image denotes a node in the graph, and the connection between the images denotes the edge of the graph. Images that are fully or partially connected via a foreground or background relationship can be automatically segmented by propagating the semantic information and learning the segmentation models from the labeled images.

In the active segmentation refinement 106, the refinement information is propagated for images that are segmented poorly. Some images can be segmented poorly due to lack of model information. Active learner of segmentation model can select those poorly segmented images with typical errors to request the user for refinement. This error refinement information can be automatically propagated to other related images with similar errors. The segmentation of these images can be automatically refined using the newly added refinement model. Meanwhile, regional refinement is done to automatically correct obvious errors.

Code Book Construction

As previously mentioned, words of the images are extracted in order to understand and analyze the basic components of the groups of images. Word detectors can be utilized. Both dense and sparse local feature detectors are combined to form a robust and distinctive detector. Meanwhile, both color and texture feature descriptors are combined to form a robust and distinctive descriptor. At first, scale and rotation invariant interest points are detected to eliminate the disturbance from the useless or redundant regions. A fast Hessian-based detector can be applied to detect the salient regions. Furthermore, the descriptor can be used to describe the texture of the interest region naturally. All the descriptors of all the images could then be clustered into $k_1$ surf-clusters by K-means algorithm. The interest regions can be circled with different color according to their descriptor which belongs to different cluster. Descriptors describe the texture of the gray-scale images. However, the texture alone does not always reflect the appearance of the images. Color information is also needed to enhance the representation capability of the words. In order to construct the color code book, the original images are down-sampled, and the HSV colors of the sampled pixels are clustered to $k_2$ color-clusters. Pixels of the images are painted with different colors to illustrate that they are clustered into different color-clusters.

Grouping

Figure 2A:
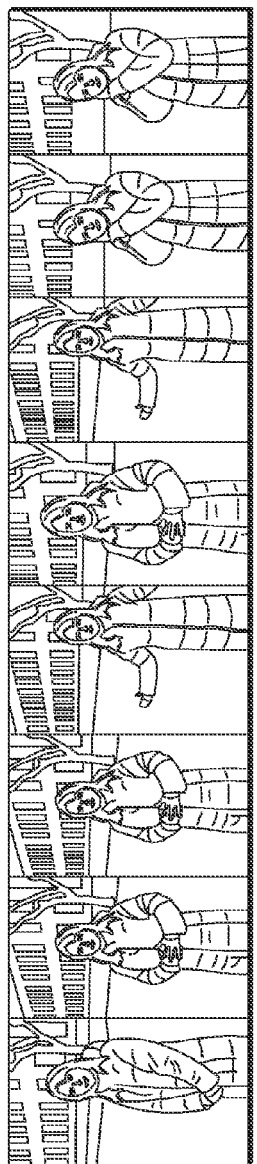
FIGS. 2A-2C illustrate examples of similar image grouping results according to one embodiment.
Figure 2B:
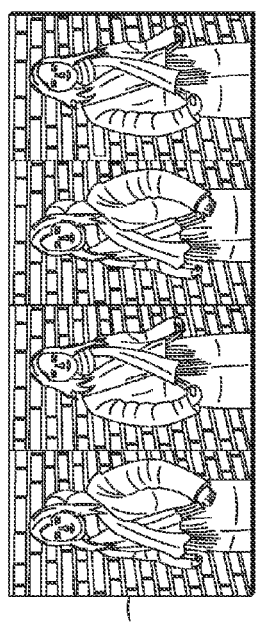
Figure 2C:
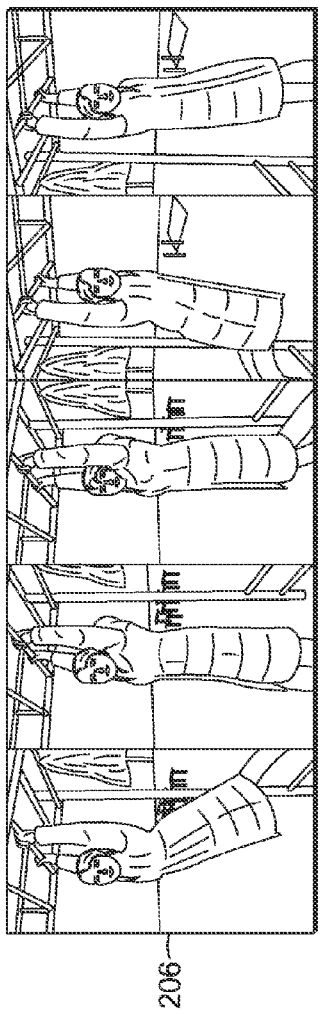

FIGS. 2A-2C illustrate examples of similar image grouping results according to one embodiment. Image groups 202, 204 and 206 are exemplary groups of images that are selected and grouped according to similarities. As illustrated, image groups 202, 204 and 206 have similar foregrounds and backgrounds. In one embodiment, images may be grouped according to their similarities. After getting knowledge of the basic components of the images, similar images could be grouped by comparing histogram similarity based on texture-color combined words.

This combined feature could enhance the robustness. Given two histograms H1, H2, which are normalized to be ranged within 0~1 respectively, then the similarity of the two histograms is defined as the correlation:

$$s(H_1, H_2) = \frac{\sum_w p_1(w) \cdot p_2(w)}{\sqrt{\sum_w p_1^2(w) \cdot \sum_w p_2^2(w)}},$$

$$\sum_w p_1(w) = 1, \sum_w p_2(w) = 1$$

Given the texture and color words histogram as $H_c$, $H_t$ respectively, the similarity of two images based on the combined feature is defined as follows:

$$s(H_1, H_2) = \alpha \cdot s(H_{c1}, H_{c2}) + (1-\alpha) \cdot s(H_{t1}, H_{t2}),$$

where $\alpha$ is the weighting coefficient.

Various grouping algorithms can be applied for similar images grouping. All the images in a given image group can be correlated by their word histograms. Meanwhile, images belonging to different groups are selected such that the distance of their words histograms are sufficiently far away. In one aspect, an informative image can be defined for each image group. The informative image can be an image that is representative of the group, is defined the image with the highest similarity with other images.

Therefore, given a query image, the image similarity with all the groups is obtained by calculating the words histogram similarity of the query image and each group's center image. The most related group with maximum similarity is then obtained. Third, if the maximum similarity is high enough, then group this query image to this group, and resort the order of images in each group according to the sum of the similarity with other images within the group. The image with the maximum similarity sum is set as the center image; else if the maximum similarity is low, then create a new group with this query image.

In one embodiment, the most informative image can be selected from a group of images. The most informative image is the most typical images in the group. Thus, the informative image has least amount of overlapping information.

Various incremental selection algorithms can be applied to select the image with the maximum additional information to the previous selected images. Specifically, because the images in each group could be regarded to contain the similar information, a hierarchical selection can be utilized to simplify and accelerate the selection procedure by making use of the grouping results. Thus, the most typical groups are selected first, and then the most informative image is selected in each group.

Given a group $G_k$, and the current set of the previous selected groups S, the additional information is defined via the information of the group $G_k$ and the overlapping information between the group and the current set S.

$$A(G_k, S) = F(G_k) - O(G_k, S)$$

The information of each group is evaluated according to the combined overall histogram of all the images of the group. Given a group $G_k$, suppose that there are N images and each image is denoted as $I_j$, $j \in [1, N]$, the histogram of each image as $h_j(w_i)$, then the overall histogram of the group is defined as:

$$h(w_i) = \frac{\sum_j h_j(w_i)}{N}, \sum_i h(w_i) = 1$$

Use the Shannon theory to define the information that the group $G_k$ contains as:

$$E(G_k) = -\sum_i h(w_i) \cdot \log h(w_i)$$

And its similarity with the rest of the images is defined as:

$$C(G_k) = \sum_{j \neq k} R(G_k, G_j)$$

The first selected group of images could be the group with the highest information as well as the highest similarity compared with other groups. Denote the combined information as follows:

$$F(G_k) = \beta \cdot E(G_k) + (1-\beta) \cdot C(G_k)$$

The overlapping information of the group $G_k$ and the set S is defined as the maximum intersection of the histogram between the group $G_k$ and each group of the set S.

$$O(G_k, S) = \max_{G_j \in S} T(H_{G_k}, H_{G_j})$$

Then groups of images are selected progressively, and the center image of the query groups is output to request the user for labeling.

Foreground and Background Categorization

After receiving knowledge of the foreground/background semantics of the user labeled images, the images are classified by the category of foregrounds and backgrounds. Furthermore, the correspondence between the unlabeled images and the foregrounds and backgrounds category could be explored for further propagation.

Figure 3A:
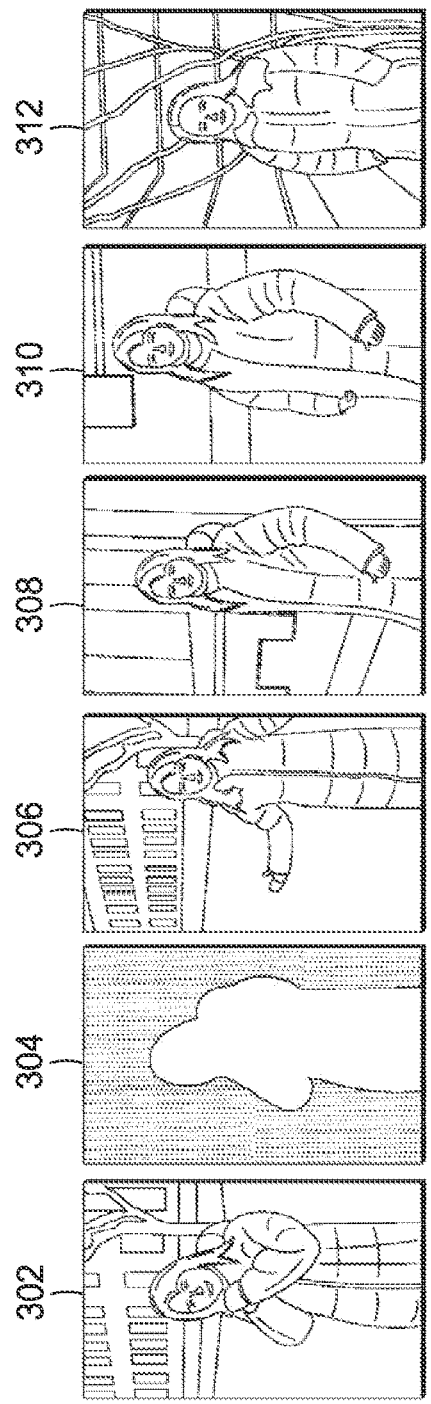
FIGS. 3A and 3B illustrate the results of the foreground and background categorization results according to one embodiment.
Figure 3B:
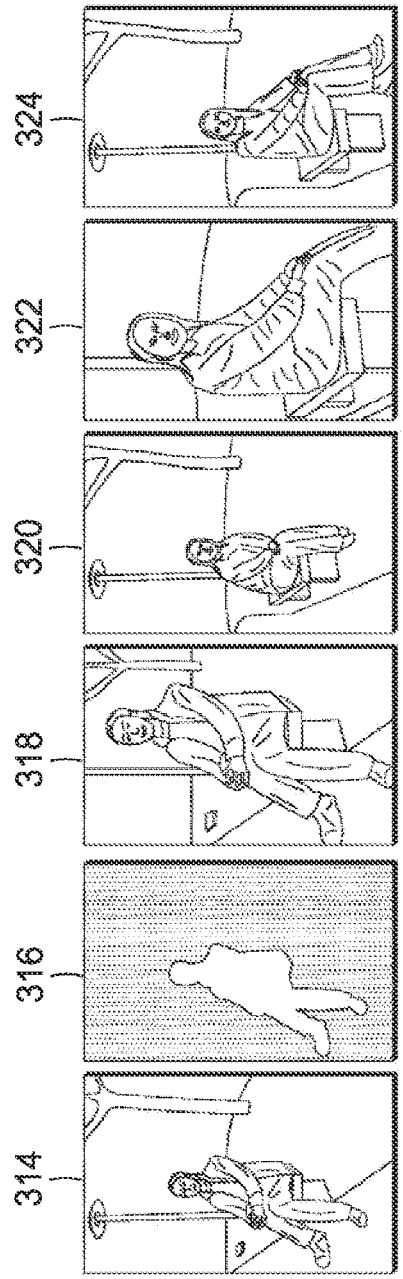

FIGS. 3A-3B illustrate the results of the foreground and background categorization results according to one embodiment. FIG. 3A illustrates a training image 302 and a training mask 304. The training image 302 and a training mask 304 can be utilized to classify images using the foreground images. For example, images 306-312 can be images that are classified to be in the same category based on their foreground. FIG. 3B illustrates a training image 314 and a training mask 316. The training image 314 and a training mask 316 can be utilized to classify images using the background images. For example, images 318-324 can be images that are classified to be in the same category based on their background.

Various algorithms can be applied for foreground/background categorization. The correspondence of a labeled image and a specific foreground or background category is constructed if the words histograms of the category and the corresponding foreground/background part of the labeled image are sufficiently similar. Specifically, the center and covariance of the clusters of the feature words of the category is re-estimated via the samples.

Given an unlabeled image, or an image for which a user has not provided semantic information, it can be determined whether the image is related to a specific foreground or background category. This determination can be performed via feature histogram comparison as well as the validation based on spatial configuration. Specifically, the common histogram element between the query image and the specific foreground or background category is regarded as those feature words which are under the constraint of the estimated center and the covariance of that category. If the histograms of the category and the query image are highly related, then spatial validation is executed. In one embodiment, histogram similarity can evaluated using the spatial correspondence of the words. For instance, a special weighing method can be utilized. In one exemplary algorithm, corresponding feature points in the two corresponding images to be validated are selected. The pair of feature points belonging to the same word are sorted via the L2 distance of the feature points in the feature space. The top k (k is set to be the minimum between the pair number and 30) pairs is selected. Give one pair of feature points, a spatial weighting mask can be established on the query image via shift, scaling and rotation parameter estimation. The estimated mask is supposed to be shifted, scaled and rotated around the query feature point from the original mask. The estimated mask can be established via mapping the pixels in the query image back to the pixels in the labeled image.

The positions, radii, and dominant angles of the two feature points are denoted as $P_o(x_o, y_o)$, $P_q(x_q, y_q)$, $r_o$, $r_q$, $\theta_o$, $\theta_q$.

The subscript o means that it is from the labeled image, q means that it is from the query image. The scaling and rotation parameter is $r = r_o/r_q$, $\theta_o - \theta_q$. Given one pixel point $(x_2, y_2)$ in the query image, then map it to the pixel point $(x_1, y_1)$ in the labeled image, $$x_1 = x_o + (y_2 - y_q) \cdot r \cdot \cos\theta + (x_2 - x_q) \cdot r \cdot \sin\theta$$

$$y_1 = y_o + (x_2 - x_q) \cdot r \cdot \cos\theta - (y_2 - y_q) \cdot r \cdot \sin\theta$$

If $(x_1, y_1)$ is a pixel within the mask, then $(x_2, y_2)$ is also set as an estimated mask pixel. All the estimated masks are summed and normalized. The histogram correspondence of the query image with the spatial mask is calculated, as well as the total histogram of some specific foreground or background category. If it's high enough, then it passes the validation, and it could be assigned to this foreground or background category.

Semantic Propagation in Segmentation

The foreground and background segmentation problem is formulated as the optimization problem of Gibbs energy.

$$E(L) = \sum_{p \in v} E_{data}(p, l_p) + \lambda \cdot \sum_{(p,q) \in e} E_{smooth}(p, q, l_p, l_q),$$

where L is the foreground or background labeling of all the pixels, $l_p$ is the labeling of a pixel p, which is set as 0 (background) or 1 (foreground). $E_{data}(p, l_p)$ represents the data cost of the pixel p when it is labeled as $l_p$, $E_{smooth}(p, q, l_p, l_q)$ represents the smoothness cost of the adjacent pixels p, q labeled as $l_p$ and $l_q$ respectively, where the neighborhood is defined as 8-connected neighborhood. $\lambda$ is the parameter that balance the two terms. The smoothness term can be generally set as follows:

$$E_{smooth}(p, q, l_p, l_q) = \begin{cases} \beta \cdot \|r_p - r_q\|^2, & l_p \neq l_q \\ 0, & l_p = l_q \end{cases},$$

$$\beta = (2\langle\|r_p - r_q\|^2\rangle)^{-1}$$

Use GMM (Gaussian Mixture Model) to represent the foreground/background color model, and there is:

$$G_c(x) = \sum_k w_{ck} \cdot N(x; \mu_{ck}, \Sigma_{ck}), c = \{1, 0\},$$

where c denotes the foreground or background model (c=0 for background, c=1 for foreground), k is the index of the Gaussian component of the model, $w_{ck}, \mu_{ck}, \Sigma_{ck}$ denote the weight, mean and covariance of the specific Gaussian model respectively. The parameters of the GMM model of the specific foreground or background category are based on the K-means clustering in the code book construction process. If there are some bins that have no samples, just simply remove the bin. If there are multiple labeled images that support one foreground or one background simultaneously, then the combined GMM model is constructed via the following method. Considering every K-means center, if it is far away from existing k-means center, then it is added as a new cluster center of the combined model; else if it is near with one existing k-means center, then it is combined with the previous models center, by averaging the mean and the covariance. The discriminative model could be generated by the likelihood ratio of foreground and background:

$$\rho_c(x) = \frac{G_c(x)}{G_c(x) + G_{1-c}(x)}$$

And the data energy could be defined as the log of the ratio:

$$E_{data}(p, l_p) = -\log \rho_{l_p}(x_p)$$

After defining the data as well as the smoothness term, the Graph-cut algorithm could be applied to solve the optimization problem.

In one embodiment, semantic propagation can be executed when both the foreground and background models are known.

Figure 4A:
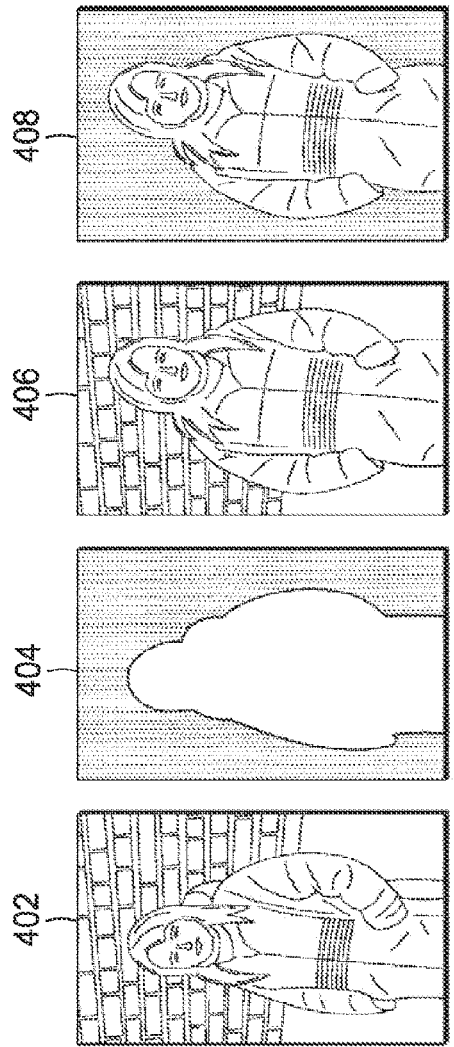
FIGS. 4A and 4B illustrate exemplary images for propagated segmentation when both foreground and background model are known according to one embodiment.
Figure 4B:
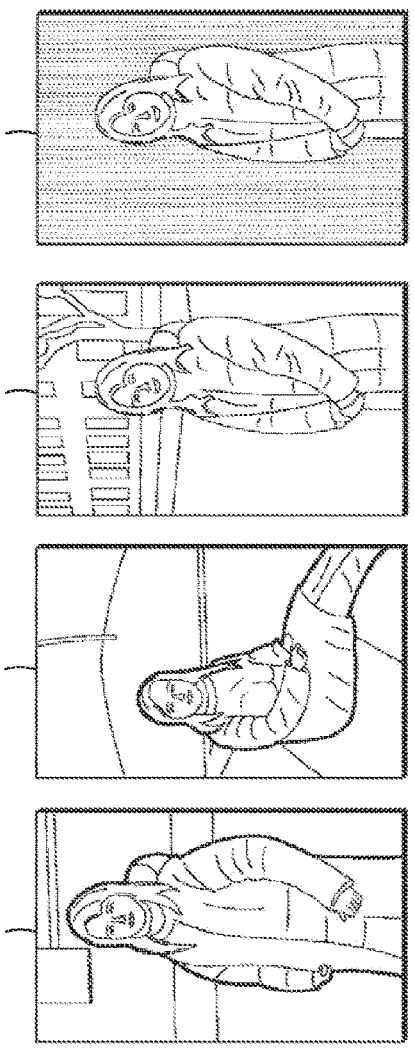

FIGS. 4A and 4B illustrates exemplary images for propagated segmentation when both the foreground and background models are known according to one embodiment. In one example, when the two images share both similar foreground and similar background the foreground and the background models can be propagated between images. Thus, image 406 has similar foreground and background as image 402. The semantic information of image 402, such as mask 404, can be propagated to image 406 so as to derive image 408.

In another example, if the images share similar foreground with one image and similar background with another image both the foreground and background models can also be propagated between images. For instance, image 414 includes similar foreground as image 410 and similar background as image 412. Thus, semantic information of image 412 and 414 can be propagated to derive image 416.

In another embodiment, semantic propagation can be executed when either only the foreground or the background models are known. Using the grab-cut framework, an iterative graph-cut algorithm based on estimated foreground or background model can be utilized to solve the partially known foreground or background model. Thus, the foreground or background likelihood of the pixels could still be estimated using the known generative GMM model. Here, the known foreground or background is called a ground-side, while the unknown one as opposite-side.

For the initial estimation, the ground side estimation is limited to a large constant, while the opposite side estimation is limited to a low constant. In another aspect, another strategy can be to select the n pixels with the lowest and highest probability as the opposite-side and ground-side samples respectively. The estimated GMM model of the foreground and background could be constructed using those samples. And the graph-cut could be applied to get an initial segmentation result. Graph-cut formulates the problem as a Markov random field, which helps to extend the unsure pixels (those pixels with different labels in estimated foreground and background) to a hard solution.

For the iterative update in each round, assuming that the hard segmented opposite-side part is always convincing, the ground-side model can be extended by adding those pixels segmented as ground-side within the constraint of previous discriminative model. The foreground and background model can be extended with low risk using this method. Then iterative graph-cut is applied via this iterative foreground and background model estimation. The progress is terminated until segmentation convergence is achieved.

Active Segmentation Refinement

After the semantics propagation in segmentation, some of the segmentation results can be refined to be satisfactory. The segmentation quality can be evaluated via both the similarity between the segmented results of the query image and the corresponding category, and the smoothness of the segmentation boundary. Given one binary image $M_{I_j}$ which describes the segmentation result, the similarity between the segmented result and the corresponding category is defined as the correlation of the feature histogram, denoted as $Q_r(M_{I_j})$. The smoothness is defined to be related with the area distribution of the segmented result. If there are $n_c$ foreground and background regions, the areas of foreground and background regions are denoted as $a_{cj}$, $c=\{1, 0\}$, $j \in n_j$, and normalized by the sum of the foreground/background regions area as $$\rho_{cj} = \frac{a_{cj}}{\sum_i a_{ci}}.$$

Then the smoothness quality of the segmented result is defined as:

$$Q_s(M_{I_j}) = -\sum_c \sum_j \rho_{cj} \cdot \log \rho_{cj}$$

If Q is high, then it means that the segmentation is of low quality. This is designed based on the observation that if the segmentation result is quite fragmented, then the quality is low. So the overall segmentation quality of the segmented image is combined by the two rules:

$$Q(M_{I_j}) = \alpha \cdot [1 - Q_r(M_{I_j})] + (1-\alpha) \cdot Q_s(M_{I_j}) \qquad (18)$$

In one embodiment, the following steps can be utilized to organize the similar segmented results. Images with the similar foreground model as well as the similar background model are merged into one group. The images in each group can be sorted according to the segmentation quality. The groups of images can be divided into two types: one is images with only one known segmentation model; and the other is images with both two segmentation models. The estimated graph relationship in the groups of images can be constructed with only one know segmentation model. All the groups of images with the two types can be sorted using the image with the worst segmentation quality.

Furthermore, the active learning rule for refinement can be implemented via various algorithms. In one example, an algorithm may involve selecting images with only one known segmentation model. Images with the relative low segmentation quality with no overlapping category with the previous selected images can be selected greedily. Furthermore, images with low segmentation quality in each group can be selected first. The selected segmentation result can then be output. Further user refinement information can be received from the user.

Given the newly labeled binary image $I_m$, the refinement information can be propagated among the similar images and the updated the model of foreground or background category as well.

In one embodiment, foreground/background segmentation can be refined in similar images via corrected foreground/background mask. Once the user gives the refinement, the refined segmentation result can be compared with the previous segmentation results to get the refined foreground or background mask. This can reflect both the correctly segmented parts and the wrongly segmented parts. The correct segmentation model $G_{ct}$ (c={0, 1}) can be modeled by the known correct foreground/background part, and the false segmentation model $G_{cf}$ is modeled by the refined foreground/background parts. The discriminative model of the correct and false part could be set as:

$$\rho_{c,t}(x) = \frac{G_{ct}(x)}{G_{ct}(x) + G_{cf}(x)}, \rho_{c,f}(x) = \frac{G_{cf}(x)}{G_{ct}(x) + G_{cf}(x)}$$

Then the data term of the refined part is set as:

$$E_{data}(p, l_p) = \begin{cases} -\log\rho_{c,t}(x_p), & l_p = c \\ -\log\rho_{c,f}(x_p), & l_p = 1-c, \text{ if } M_k(p) = c \end{cases}$$

The data term of the reserved part is set as:

$$E_{data}(p, l_p) = \begin{cases} 0, & l_p = 1-c \\ +\infty, & l_p = c, \text{ if } M_k(p) = 1-c \end{cases}$$

Graph-cut can then be used to obtain a refined result.

Figure 5A:
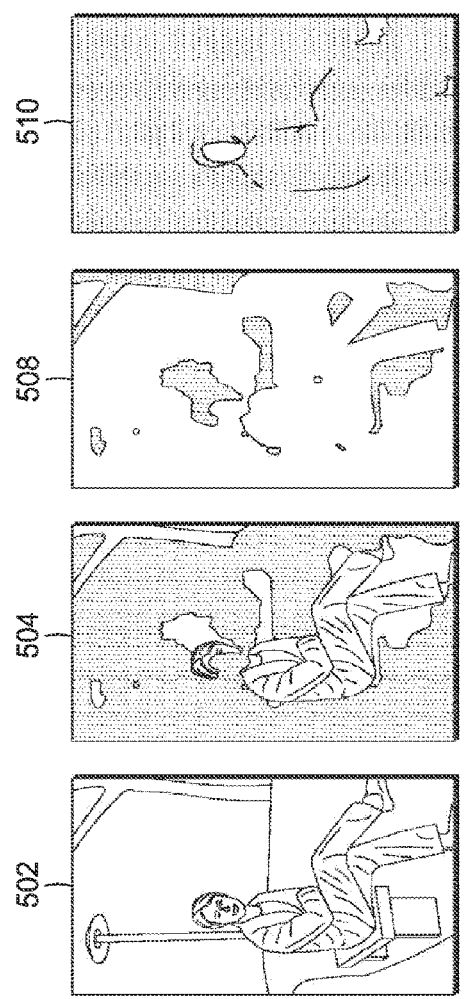
FIGS. 5A and 5B illustrate a background refined segmentation based on the foreground refined segmentation result according to one embodiment.
Figure 5B:
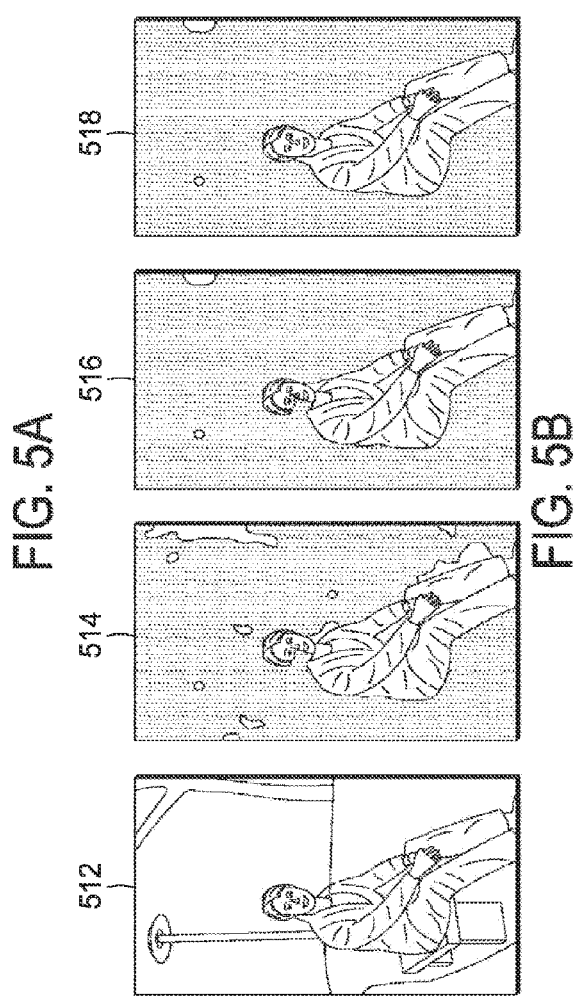

FIG. 5 illustrates a background refined segmentation based on the foreground refined segmentation result according to one embodiment. Original query images 502 and 512 can be used. Previous segmented results can be shown in images 504 and 514. A user corrected foreground mask 508 can be used for refinement. In addition, a user corrected background mask 510 can also be used. At first the foreground can be refined by the corrected foreground part as shown in image 516. Furthermore, the background can be refined based on the foreground refined result using mask 510.

The segmentation model can be using both the newly added and the updated category. If there is any newly refined image that contains an unknown foreground or background, then the new semantics provided by the user could be trained to form a new foreground or background category. The unlabeled images which are related with this new category can be re-segmented. The newly added semantics is trained to update the segmentation model.

In one embodiment, one type of regional refinement can be executed wherein the hole in the foreground is filled. In another type of regional refinement, fragmented parts can be eliminated to be background.

First of all, it can be determined which parts are holes in the foreground and which parts are external parts that may belong to the background by the contour hierarchical tree construction. Then the internal part of the hole is filled as the foreground pixels, and in the meanwhile the internal part of the fragmented part are filled as the background pixels. If the similarity between the segmented result of the query image and the corresponding category model is enhanced after the hole is added into the foreground or the fragmented part is removed from the foreground, then the operation is accepted, otherwise it is rejected.

In one embodiment, in order to obtain satisfactory segmentation results, three levels of incremental iteration can be used. A first level is can be to refine the segmentation model iteratively until all the images in the same group are segmented correctly. If there are still images with low segmentation quality, or partially segmentation model, select the images are selected for refinement. The second level is to obtain the semantics information (such as, foreground or background category) iteratively until all the foregrounds and backgrounds in the current connected subgraph are revealed. The third level can include obtaining all the segmentation models as well as the semantics of all the connected subgraphs iteratively until all the images in the whole graph are segmented correctly. If there are still images with unknown foreground or background, select them for user labeling and the foreground portions can be cut out.

Figure 6:
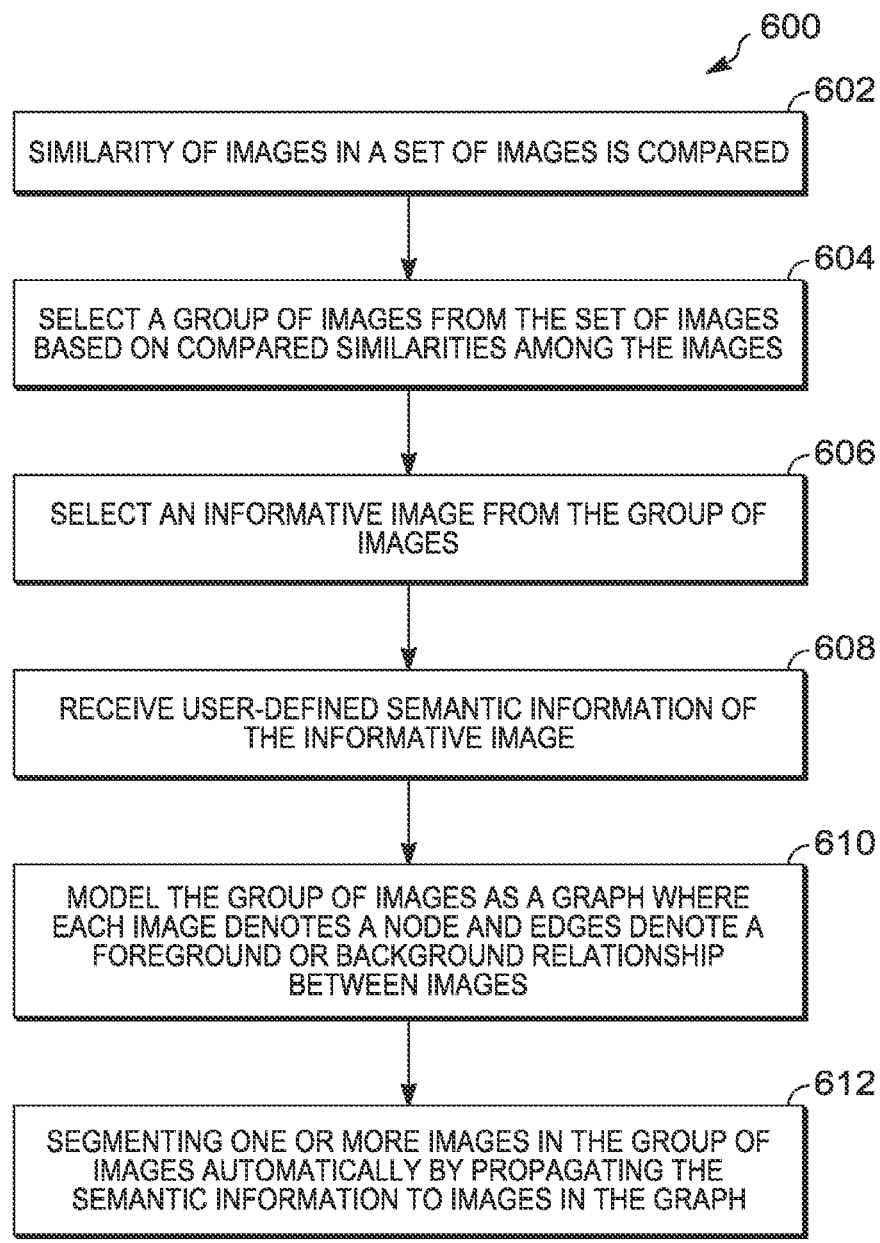
FIG. 6 illustrates a flow diagram of a process for providing active segmentation for groups of images according to one embodiment.

FIG. 6 illustrates a flow diagram of a process for providing active segmentation for groups of images according to one embodiment. At process block 602, the similarity of images in a set of images is compared. Process 600 continues at process block 604.

At process block 604, images are clustered into groups. The clustering is based on compared similarities among the images. Process 600 continues at process block 606.

At process block 606, an informative image is selected from each group of images. Process 600 continues at process block 608. At process block 608, user-defined semantic information of the informative image is received. Process 600 continues at process block 610.

At process block 610, the group of images is modeled as a graph. Each image in the group of images denotes a node in the graph. Edges of the graph denote a foreground relationship between images or a background relationship between images. Process 600 continues at process block 612.

At process block 612, one or more images in the group are automatically segmented by propagating the semantic information of the informative image to other images in the group having a corresponding graph node that is related to a graph node corresponding to the informative image.

Figure 7:
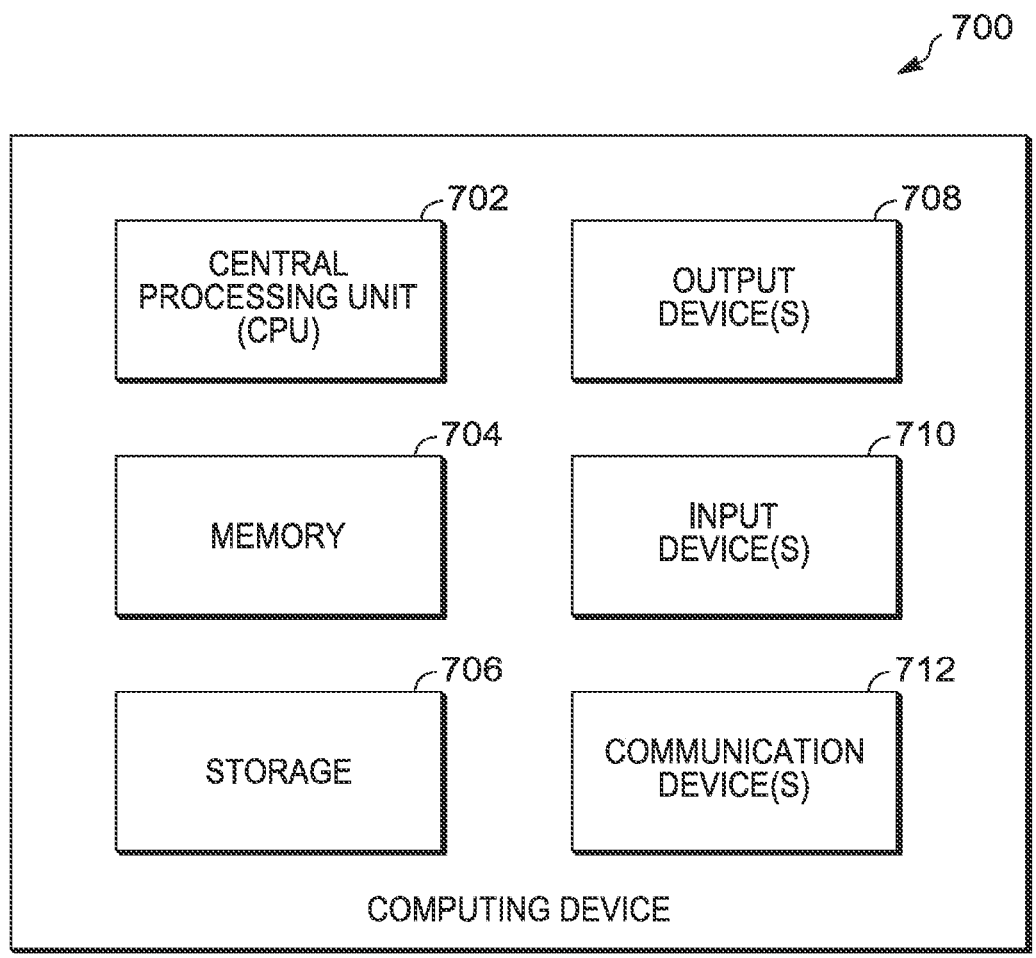
FIG. 7 illustrates a component diagram of a computing device for implementing one or more embodiments.

FIG. 7 illustrates a component diagram of a computing device for implementing one or more embodiments. The computing device 700 can be utilized to implement one or more computing devices, computer processes, or software modules described herein. In one example, the computing device 700 can be utilized to process calculations, execute instructions, receive and transmit digital signals. In another example, the computing device 700 can be utilized to process calculations, execute instructions, receive and transmit digital signals, receive and transmit search queries, and hypertext, compile computer code, as required by the synchronization module 202, the posting management module 204, and the file system module 206.

The computing device 700 can be any general or special purpose computer now known or to become known capable of performing the steps and/or performing the functions described herein, either in software, hardware, firmware, or a combination thereof.

In its most basic configuration, computing device 700 typically includes at least one central processing unit (CPU) 702 and memory 704. Depending on the exact configuration and type of computing device, memory 704 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 206. Computer storage media includes volatile and nonvolatile, removable and non-removable media implemented in any method or technology for storage of information such as computer readable instructions, data structures, program modules or other data. Memory 704 and storage 706 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 712 that allow the device to communicate with other devices. Communications device(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 710 such as keyboard, mouse, pen, voice input device, touch input device, etc. Output device(s) 708 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

What is claimed is:

1. A computer-implemented method comprising:
by one or more processors, selecting an informative image that is representative of a group of similar images;
automatically modeling the group of similar images to construct a graph including one or more edges that indicate at least one of a foreground relationship or a background relationship between two or more images in the group of similar images; and
segmenting one or more images in the group of similar images by propagating semantic information of the informative image to at least one image in the group of similar images, the propagating based on a relationship in the graph between the informative image and the at least one image.

2. The method of claim 1, further comprising receiving the semantic information for the informative image.

3. The method of claim 1, wherein the semantic information is user-specified for the informative image.

4. The method of claim 1, the graph including a node for each image in the group of similar images.

5. The method of claim 1, further comprising selecting the group of similar images from a plurality of images, based on one or more similarities of a word distribution for each of the plurality of images.

6. The method of claim 1, wherein the selecting the informative image includes selecting an image in the group of similar images with a higher number of non-overlapping words in relation to other images in the group of similar images.

7. The method of claim 1, wherein the relationship in the graph between the informative image and the at least one image is indicated by an edge of the one or more edges between the informative image and the at least one image.

8. A system comprising:
one or more processing units; and
at least one software module executable by the one or more processing units to:
select an informative image from a group of similar images, the informative image being representative of the group of similar images;
construct a graph by modeling the group of similar images, the graph including one or more edges that indicate at least one of a foreground relationship or a background relationship between images in the group of similar images; and
segment one or more images in the group of similar images by propagating semantic information of the informative image to at least one image in the group of similar images, the propagating based at least in part on a relationship in the graph between the informative image and the at least one image.

9. The system of claim 8, wherein the at least one software module further operates to select the group of similar images from a plurality of images, based on one or more similarities of a word histogram for each of the plurality of images.

10. The system of claim 8, wherein the at least one software module further operates to select the group of similar images from a plurality of images, based on at least one of a foreground similarity or a background similarity.

11. The system of claim 8, wherein the at least one software module further operates to receive the semantic information for the informative image.

12. The system of claim 8, the graph including a node for each image in the group of similar images.

13. The system of claim 8, wherein the selection of the informative image includes selecting an image in the group of similar images with a higher number of non-overlapping words in relation to other images in the group of similar images.

14. The system of claim 8, wherein the relationship in the graph between the informative image and the at least one image is indicated by an edge of the one or more edges between the informative image and the at least one image.

15. One or more computer-readable storage memory devices storing computer-executable instructions that instruct a processor to perform actions comprising:
    selecting an informative image that is typical of a group of images;
    modeling the group of images to construct a graph including one or more edges that indicate at least one of a foreground relationship or a background relationship between images in the group of images; and
    segmenting one or more images in the group of images by propagating semantic information of the informative image to at least one image in the group of images.

16. The one or more computer-readable storage memory devices of claim 15, the propagating based at least in part on a relationship in the graph between the informative image and the at least one image.

17. The one or more computer-readable storage memory devices of claim 16, wherein the relationship in the graph between the informative image and the at least one image is indicated by an edge of the one or more edges between the informative image and the at least one image.

18. The one or more computer-readable storage memory devices of claim 15, the actions further comprising selecting the group of images from a plurality of images, based on one or more similarities of a word distribution for each of the plurality of images.

19. The one or more computer-readable storage memory devices of claim 15, the graph including a node for each image in the group of images.

20. The one or more computer-readable storage memory devices of claim 15, wherein the selecting the informative image includes selecting an image in the group of images with a higher number of non-overlapping words in relation to other images in the group of images.

* * * * *